F. F. STANSBURY.
COMBINATION MIRROR AND STAND.
APPLICATION FILED SEPT. 22, 1917.

1,263,955.

Patented Apr. 23, 1918.
2 SHEETS—SHEET 1.

WITNESSES
G. E. Logan Jr.
Rodney M. Smith

INVENTOR
Fred F. Stansbury
BY Victor J. Evans
ATTORNEY

F. F. STANSBURY.
COMBINATION MIRROR AND STAND.
APPLICATION FILED SEPT. 22, 1917.
1,263,955.
Patented Apr. 23, 1918.
2 SHEETS—SHEET 2.
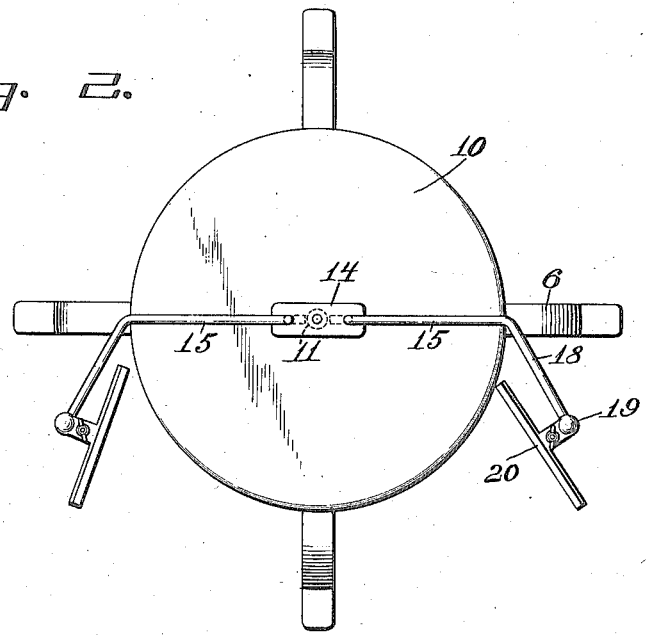
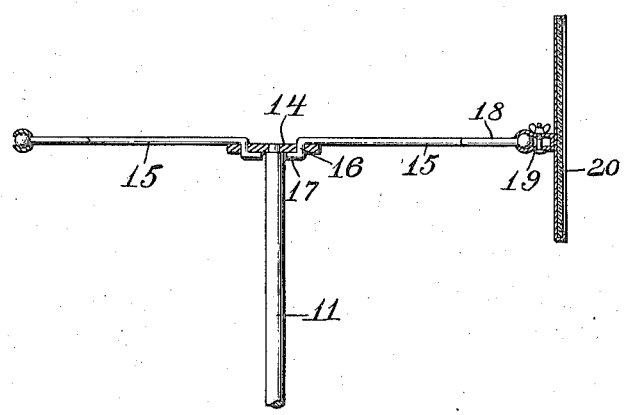
WITNESSES
G. E. Logan Jr.
Rodney M. Smith
INVENTOR
Fred F. Stansbury
BY Victor J. Evans
ATTORNEY

UNITED STATES PATENT OFFICE.

FRED F. STANSBURY, OF DEER LODGE, MONTANA.

COMBINATION MIRROR AND STAND.

1,263,955.  Specification of Letters Patent.  Patented Apr. 23, 1918.

Application filed September 22, 1917. Serial No. 192,726.

*To all whom it may concern:*

Be it known that I, FRED F. STANSBURY, a citizen of the United States, residing at Deer Lodge, in the county of Powell and State of Montana, have invented new and useful Improvements in Combination Mirrors and Stands, of which the following is a specification.

This invention relates to a combined mirror and stand and has for one of its objects the provision of an article of this nature having a multiplicity of mirror adjustments.

Another object of the invention is to provide a combined mirror and stand which may be either used as a combination article or which by a detachment of the mirrors therefrom may serve as a flower holder or table.

The invention also aims to generally improve articles of this description to render them more practical, useful and commercially desirable.

With these and other objects in view as will become more apparent as the description proceeds, the invention consists in certain novel features of construction, combination and arrangement of parts as will be hereinafter fully described, illustrated and claimed.

In the drawings,

Fig. 3 is a central vertical sectional view through the stand with the mirror omitted.

Fig. 4 is a sectional view through the top of the mirror standard showing the mirror supporting arms connected thereto, and Fig. 5 is a detail view of the universal connection between one of the mirrors and its arm.

Figure 1:
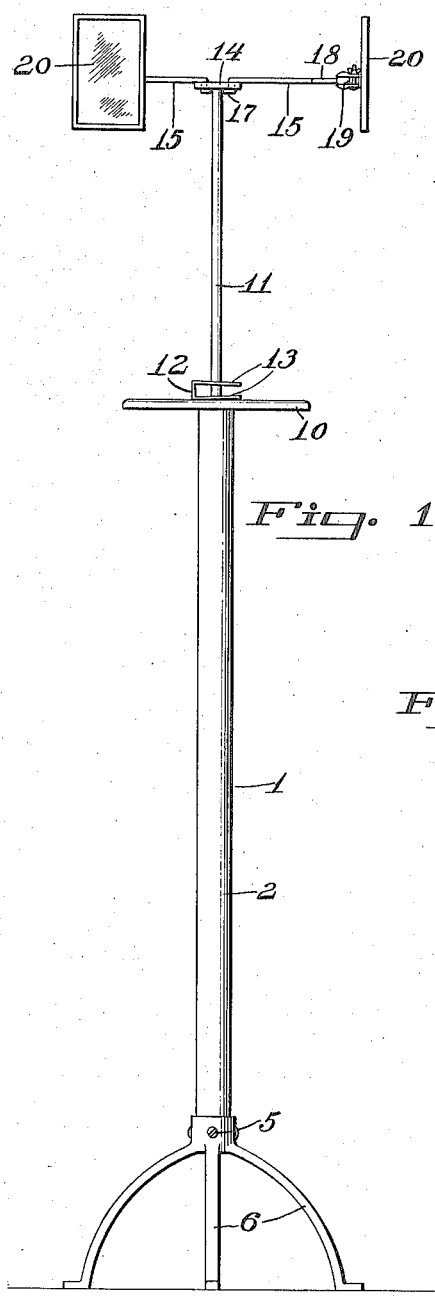
Figure 1 is a side elevation of the mirror and stand assembled.
Figure 2:
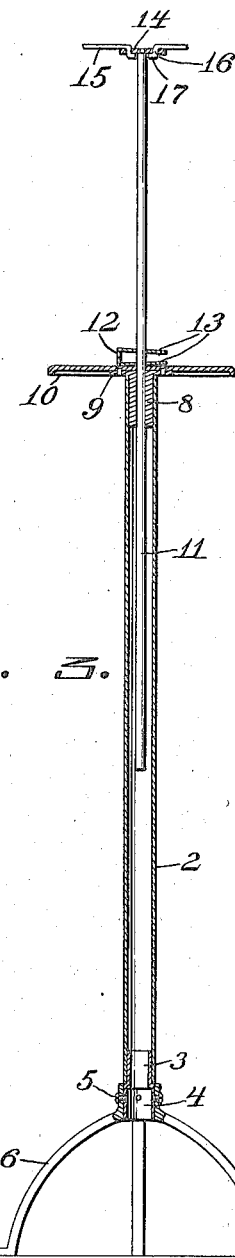
Fig. 2 is a top plan view.

Referring in detail to the drawings by numerals, 1 designates as an entirety a pedestal stand having a central tubular leg or stem 2 which fits at its lower end over the upper reduced portion 3 of a tubular head 4. The head is secured by screws 5 to a base 6 and the shoulder 7 formed by the reduced portion provides an abutment for the lower end of the stem.

A bushing 8 having a top flange 9 is fitted in the upper end of the stem and has secured to it a plate 10 which is preferably circular and which serves as a top for the stand.

A mirror standard 11 in the form of a solid cylindrical rod telescopes within the stem 2 through the bushing and plate 10 and may be secured in any adjusted position against downward movement by a spring clamp 12 which is substantially U shaped in construction having the arms 13 formed with openings through which the rod 11 extends. The arms 10 spring together and clamp against the mirror standard or rod but may be released from clamping engagement therewith by being spread slightly as will be clearly understood.

A rectangular or attaching plate 14 is fixed to the top of the mirror standard and has secured to it a pair of mirror supporting arms 15. Each arm is formed on its inner end with a depending portion 16 which extends downwardly through an opening formed in the connecting plate. The depending portion 16 is extended laterally below the plate as at 17 to engage the under side thereof. This L shaped bent portion allows for a detachable connection of the arm to the plate 14 and permits of the arm being swung in a horizontal plane. The arms are inclined downward slightly adjacent their outer portions as at 18 and are connected by universal ball and socket joints 19 to mirrors 20.

The mirrors may be set at any angle with respect to their arms and may be swung bodily by the arms and, therefore, it will be seen that they will prove of material assistance when making one's toilet. The mirror standard may be detached from the stand if desired, to permit of the stand being used separately as a center stand or table or to permit it being used as a flower holder, the stem 2 in this latter instance, providing accommodation for the stems of the flowers.

The whole device may be easily assembled for storing away or shipping. The arms, as before stated, are detachable from the connecting plate 14; the mirror standard is detachable from the stand; the bushing 8 is detachable from the stem; the stem is detachable from the head 3 and this latter member is detachable from the base 6.

From the foregoing description taken in connection with the accompanying drawings, it will be obvious that I have provided a very useful and practical toilet accessory which has many adjustments and which may be manufactured at a relatively low cost.

While I have shown and described the preferred embodiments of my invention, it will be clearly understood that I do not wish to be limited to this construction, but may make such changes as will fall within the scope and spirit of the invention as claimed.

What I claim is:—

1. In an article of the character described, a tubular stem, a bushing fitted in the upper end of said stem, a standard slidable through said bushing, a top secured to the bushing, a plate fixed to the upper end of the standard, a plurality of arms pivotally connected to said plate to swing in a horizontal plane, and a resilient member adjustably mounted on the stem.

2. In an article of the character described, a tubular stem, a bushing fitted in the upper end of said stem, a standard slidable through said bushing, a top secured to the bushing, a plate fixed to the upper end of the standard, a plurality of arms pivotally connected to said plate to swing in a horizontal plane, and a clip adjustably mounted on the stem at a point above said bushing, substantially as and for the purpose specified.

In testimony whereof I affix my signature.

FRED F. STANSBURY.